United States Patent
Bucklew et al.

(10) Patent No.: US 10,772,469 B2
(45) Date of Patent: Sep. 15, 2020

(54) REMOVABLE COOKWARE HANDLE

(71) Applicant: Columbia Insurance Company, Omaha, NE (US)

(72) Inventors: William A. Bucklew, Wilmette, IL (US); Michael R. Mastroianni, Crystal Lake, IL (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 105 days.

(21) Appl. No.: 16/110,941

(22) Filed: Aug. 23, 2018

(65) Prior Publication Data
US 2019/0059656 A1    Feb. 28, 2019

Related U.S. Application Data

(60) Provisional application No. 62/625,193, filed on Feb. 1, 2018.

(30) Foreign Application Priority Data

Aug. 24, 2017    (DE) .................... 10 2017 214 843

(51) Int. Cl.
*B65D 25/28* (2006.01)
*A47J 45/07* (2006.01)
(Continued)

(52) U.S. Cl.
CPC ........... *A47J 45/071* (2013.01); *A47J 37/108* (2013.01)

(58) Field of Classification Search
CPC ........ A47J 45/071; A47J 37/108; A47J 45/06; A47J 45/07; A47J 45/072; A47J 45/078
(Continued)

(56) References Cited

U.S. PATENT DOCUMENTS

| D412,641 S | 8/1999 | Schiffer |
| 6,250,493 B1 | 6/2001 | Kwan |

(Continued)

FOREIGN PATENT DOCUMENTS

| DE | 202006014409 U1 | 2/2007 |
| EP | 2249687 B1 | 6/2011 |

(Continued)

OTHER PUBLICATIONS

Design U.S. Appl. No. 29/635,697, filed Feb. 1, 2018.

*Primary Examiner* — J. Gregory Pickett
*Assistant Examiner* — Niki M Eloshway
(74) *Attorney, Agent, or Firm* — Thompson Coburn LLP (57) ABSTRACT

A removable cookware handle is disclosed for connection to a piece of cookware. The removable cookware handle can attach to an attachment member that is secured to the cookware piece. To facilitate locking and unlocking of the attachment member to the removable cookware handle, a plurality of button mechanism are present on the housing of the removable cookware handle. A first button mechanism of the plurality of button mechanisms is slidable in a longitudinal direction while the second button mechanism is depressible in a lateral direction. When unlocking the removable cookware handle from the attachment member, a user may depress the second button and manipulate the first button backward to allow the attachment member to be released from a locking cavity within the housing.

19 Claims, 10 Drawing Sheets

(51) Int. Cl.
*A47J 37/10* (2006.01)
*A47J 45/08* (2006.01)

(58) Field of Classification Search
USPC .................................. 220/759, 753, 753.1
See application file for complete search history.

(56) References Cited

U.S. PATENT DOCUMENTS

| | | | |
|---|---|---|---|
| 6,257,439 B1 * | 7/2001 | Hsu | A47J 45/061 16/425 |
| 6,694,868 B1 | 2/2004 | Hung | |
| D494,834 S | 8/2004 | Etlicher | |
| D498,117 S | 11/2004 | Lorthioir | |
| D578,825 S | 10/2008 | Bogani | |
| 7,611,179 B2 * | 11/2009 | Lorthioir | A47J 45/10 16/425 |
| D613,992 S | 4/2010 | Seo | |
| D629,647 S | 12/2010 | Munari | |
| D661,946 S | 6/2012 | Bogani | |
| D663,578 S | 7/2012 | Tuli | |
| D686,451 S | 7/2013 | Hasuike | |
| D702,491 S | 4/2014 | Lo | |
| 2006/0096996 A1 * | 5/2006 | Lorthioir | A47J 45/10 220/759 |
| 2009/0039096 A1 * | 2/2009 | Lorthioir | A47J 45/10 220/759 |
| 2011/0024436 A1 | 2/2011 | Baumgarten | |
| 2011/0284565 A1 * | 11/2011 | Corbin | A47J 45/10 220/759 |
| 2014/0158701 A1 * | 6/2014 | Bonnel | A47J 45/10 220/759 |
| 2014/0239005 A1 * | 8/2014 | Cuillery | A47J 45/10 220/759 |

FOREIGN PATENT DOCUMENTS

| | | |
|---|---|---|
| JP | 2013215390 A | 10/2013 |
| KR | 101092735 B1 | 12/2011 |

* cited by examiner

REMOVABLE COOKWARE HANDLE

CROSS-REFERENCE AND PRIORITY CLAIM TO RELATED PATENT APPLICATIONS

This non-provisional patent application claims priority to U.S. provisional patent application 62/625,193, filed Feb. 1, 2018, and entitled "Removable Cookware Handle", as well as claims priority to German patent application 10 2017 214 843.8, filed Aug. 24, 2017, and entitled "Handle for a Vessel and Vessel with Removable Handle", the entire disclosures of which are each incorporated herein by reference.

INTRODUCTION

Cookware pieces commonly include a handle or grasping device so that a user can easily remove and manipulate the cookware. Usually, these handles provide protection from the thermal heat exchanged between the heating apparatus and the cookware so that the user is not burned in the handling process. More importantly, these handles provides a grasping base so that users can manipulate and position the cookware so that food items are cooked in a desired orientation or method. Almost every piece of cookware produced contains some type of handle or grasping mechanism to realize these advantages.

However, it is also advantageous to produce a cookware handle which is removable from the piece of cookware. Such a removable cookware handle may provide a user with a common handle usable on every type of cookware piece stored within his/her kitchen area. Also, such a removable cookware handle may be ergonomically designed to a specific user's hand so that comfortable and fluid manipulation of cookware pieces can be obtained during its use. A removable cookware handle also provides the advantage of easy clean up when soiled. Thus, removing a cookware handle can allow a user to clean inaccessible areas of both the soiled cookware piece and the cookware handle after cooking is complete. The inventors provide these above advantages in their inventive design of a removable cookware handle.

While a removable cookware provides all of these advantages, the removable cookware handle must also be easily securable, solidly secured, and detachable from a cookware piece. Use of such easy securability and detachability can be performed with a button mechanism facilitating attachment/detachment.

As such, the inventors propose the following disclosure related to a removable cookware handle that may attach to a piece of cookware. A user may grip the removable cookware handle to manipulate the attached cookware piece. After cooking is complete, the user may wish to remove the removable cookware handle. To do so, a two-button actuation system is provided on the removable cookware handle so that when each button of the attaching/detaching mechanism is depressed and moved by the user the removable cookware handle can be removed from the cookware piece.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings.

DETAILED DESCRIPTION OF EXAMPLE EMBODIMENTS

Figure 1:
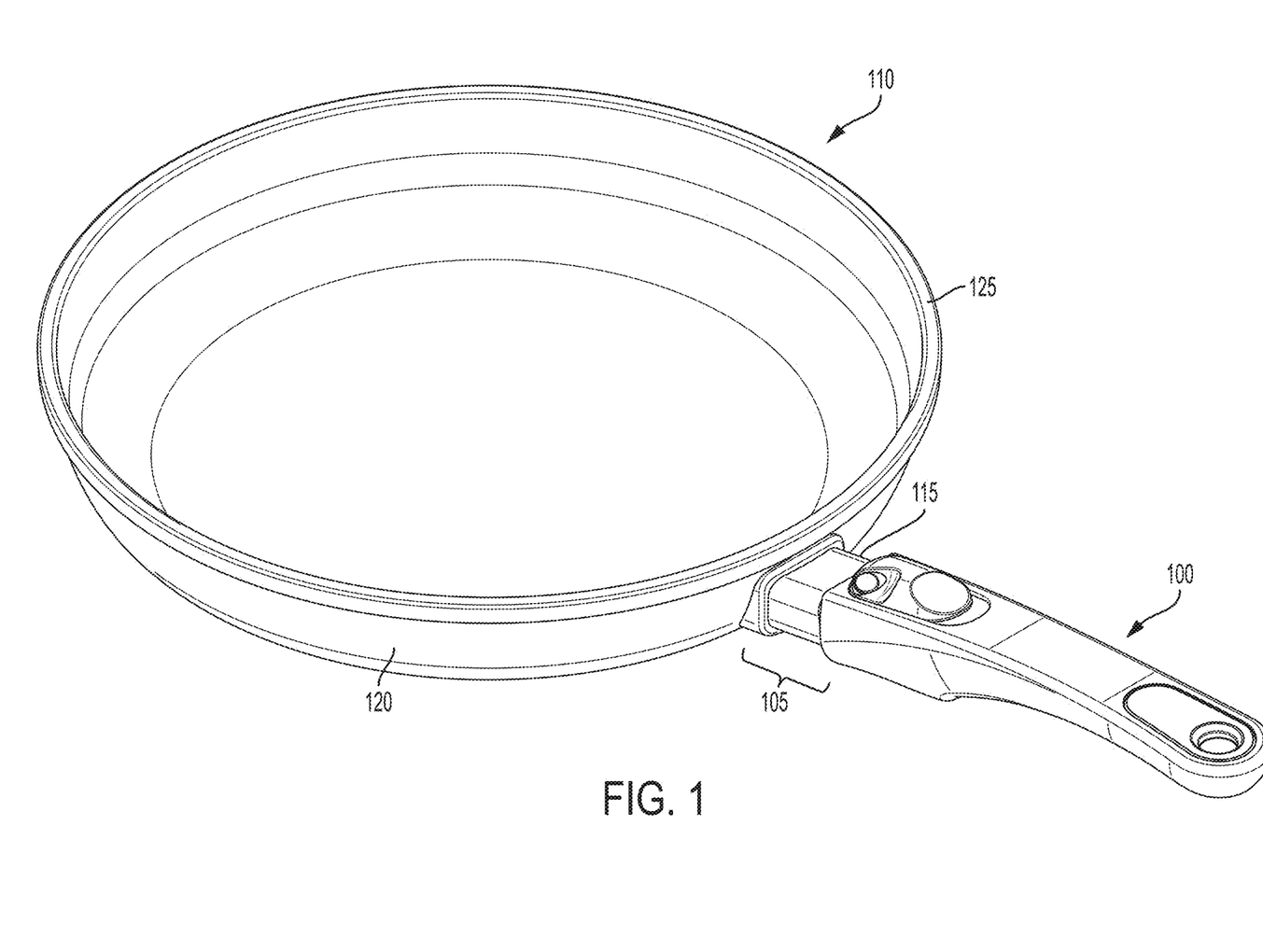
FIG. 1 shows a perspective view of a removable cookware handle as described herein connected to a piece of cookware.

FIGS. 1-9 show a removable cookware handle 100 for use with an attachment member 105. The attachment member 105 may be attached to a piece of cookware 110 for connecting the removable cookware handle 100 to the cookware piece 110. The removable cookware handle 100 is envisioned for use with a multitude of products and is capable of fitting a multitude of differently configured attachment members. As seen in FIG. 1, an example of the attachment member 105 is connected to an arm 115 extending from the cookware piece 110. The attachment member 105 may be positioned anywhere on an outside surface 120 of the cookware piece 110 in accordance with the design parameters of the cookware piece 110. In some instances, the attachment member 105 may also affix to an upper edge 125 of the cookware piece 110. Additionally, the arm 115 may be a desired length to help buffer heat transfer from the cookware piece 110 and the removable cookware handle 100. While a smaller arm 115 is viewed in FIG. 1, it should be understood that different length or shapes of the arm may be used to attach the arm 115 to the attachment member 105. In this particular example the cookware piece 110 is a skillet pan, but it should be understood that other types of cookware, pots, strainers, or the like, may be fashioned to connect to the removable cookware handle 100. It should also be understood that the size of the removable cookware handle 100 may differ based on the size of the cookware piece 110 it may attach too. Thus, for larger skillets and heavier pots, the removable cookware handle 100 may be longer in length to allow for easy grasping by a user at a comfortable fulcrum point to lift and manually manipulate the cookware piece 110. In other embodiments (not shown), the cookware piece 110 may have multiple attachment members 105 positioned on the outside surface 120 of the cookware piece 110. These multiple attachment members 105 may each individually accept a removable cookware handle 100 so that a user may manipulate the cookware piece 110 with both hands.

Figure 2:
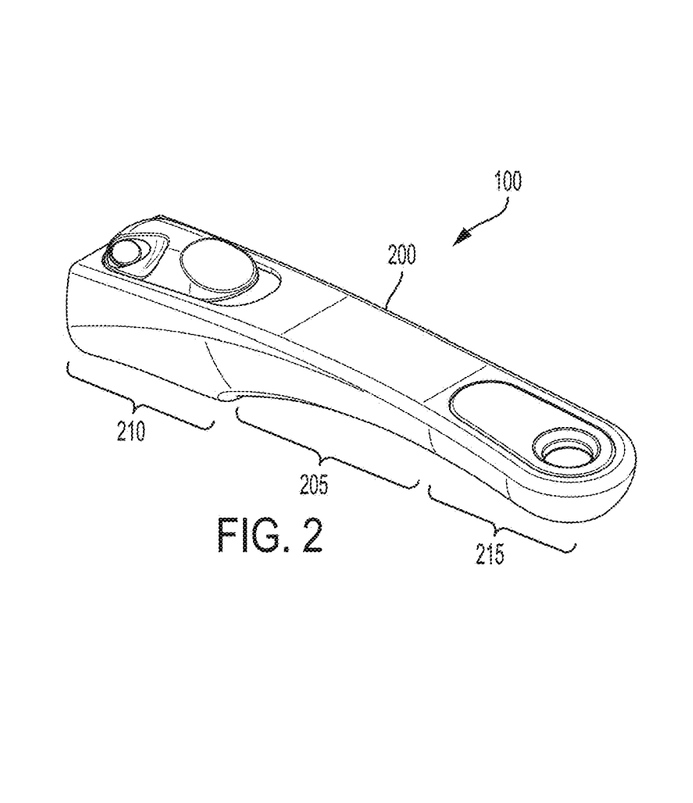
FIG. 2 shows a perspective view of the removable cookware handle unattached to a piece of cookware.
Figure 3:
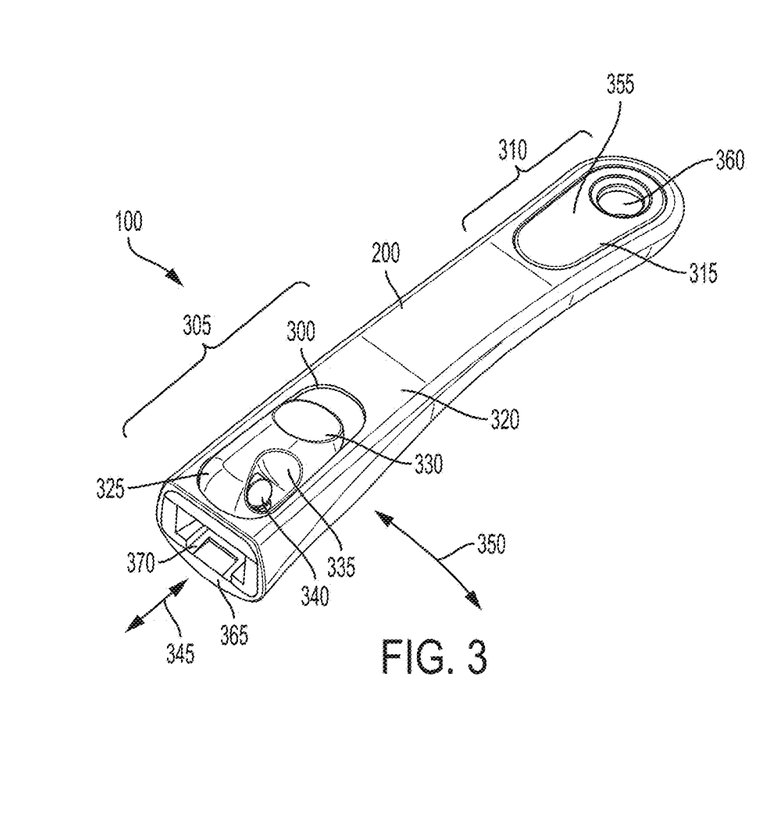
FIG. 3 shows another perspective view of the removable cookware handle unattached to a piece of cookware.

In FIGS. 2 and 3, perspective views of the removable cookware handle 100 are shown without attachment to the attachment member 105 and cookware piece 110. Here, the exterior components of the removable cookware handle 100 are viewed in greater detail. The removable cookware handle 100 may have a housing 200 configured to provide a substantial amount of the mass of the removable cookware handle 100. The housing 200 may be machine milled, machine formed, or mold injected based on the material used to form the housing 200 of the removable cookware handle 100. The housing 200 may be made of any suitable thermally resistant material, such that the heating of the adjacent attached cookware piece 100 or conductive heating by the attachment member 105 does not cause the housing 200 to warp, deform, or melt. In the viewed example, this material may be a thermally resistant plastic polymer. However, it should be understood that thermally resistant rubbers, metals, metallic alloys, composites, or the like may also be used. Furthermore, the housing 200 is configured into an ergonomic shape to facilitate easy grasping and control of the attached cookware piece 110 by the user. The housing 200 may have an interior/middle 205 and a first longitudinal end 210 and a second longitudinal end 215. The housing 200 may have a larger cross-sectional area at the first longitudinal end 210 while slowly tapering towards a smaller cross-sectional area at the middle of the removable cookware handle 100. The second longitudinal end 215 of the housing 200 may further contract into an even smaller cross-sectional area. However, in the shown example embodiment, the second longitudinal end's 215 cross-sectional area may expand slightly in comparison with the middle 205 cross-sectional area. This slight increase in size allows for a better ergonomic fit of the user's hand when grasping the removable cookware handle 100 while also preventing the removable cookware handle 100 from slipping out of the user's hand when manipulating the attached cookware piece 110.

On the top side of the housing 200 a first cavity 300 may be carved out near the front portion 305 of the removable cookware handle 100. At the back portion 310 of the removable cookware handle 100 a second cavity 315 may be carved out as well. Within the first cavity 300 the top surface 320 of the housing 200 is lowered a bit and the first cavity 300 is formed to configure to the shape of a first button mechanism 325. In the viewed embodiment, the first button mechanism 325 is slidable within the first cavity 300 and anchored within the first cavity 300 by attaching the first button mechanism 325 to interior components of the removable cookware handle 100. A user may manipulate the first button mechanism 325 in a front motion or a back motion to facilitate attachment and detachment of the removable cookware handle 100 to the attachment member 105 connected to the cookware piece 100. The first button mechanism 325 may further have a first recess 330 on the back end of the first button mechanism 325. The first recess 330 may be ergonomically configured to accept a user's thumb or finger when grasping the removable cookware handle 100. When placing the user's thumb or finger with the first recess 330, the sliding action of the first button can be easily achieved for attaching or detaching the removable cookware handle 100 to the cookware piece 110.

Also present on the first button mechanism 325 is a second recess 335. As shown in the example figures, this second recess 335 may be located on a front left side of the first button mechanism 325. It should also be noted that the second recess 335 may be located on a front right side of the first button mechanism 325. The location of the second recess 335 within the first button mechanism 325 may be configured to accommodate users with different dominant hands. Hence, the second recess 335 on the front left side (as shown) may be used to accommodate users who are accustomed to grasping the removable cookware handle 100 with their right hand. The location of the second recess 335 on the front right side would therefore be used to accommodate users who are accustomed to grasping the removable cookware handle 100 with their left hand. The second recess 335, like the first recess 330, may have an ergonomic shape to accept a user's thumb or finger in a comfortable position while grasping the handle.

Contained within the second recess 335 is a second button mechanism 340 located within the first button mechanism 325. The second button mechanism 340 is located at a perpendicular direction to the first button mechanism 325. If the first button mechanism 325 is movable in a front and back position along an x axis 345, the second button mechanism 340 is movable in an extended to a depressed position within the first button mechanism 325 along a y axis 350. Thus, when a user is manipulating the handle and perhaps grasping the first button mechanism 325, inadvertant manipulation of the removable cookware handle 100 in along the x axis 345 will not trigger the second button mechanism 340 thereby dislodging the attachment of the removable cookware handle 100 from the cookware piece 110. The second button mechanism 340 is configured to be resting in an expanded position protruding from the first button mechanism 325 through the second recess 335. When depressed, the second button mechanism 340 enters the first button mechanism 325 where the user may then slide the first button mechanism 325 backwards in a single motion. If the second recess 335 is located on the opposite side of the first button mechanism 325 a similar single motion may depress the second button mechanism 340 and pull back the first button mechanism 325 by a left handed user.

At the back portion 310 of the removable cookware handle 100, the second cavity 315 may be present and carved out of the housing 200. Within the second cavity 315, the top surface 320 of the housing 200 is lowered a bit and the second cavity 315 is formed to configure to the shape of an insertable plate 355. The insertable plate 355 may have numerous functions or functionalities. In some embodiments, the insertable plate 355 provides an ornamental design for the removable cookware handle 100. In other embodiments, the insertable plate 355 can be a source identifier for the company producing the removable cookware handle 100 or provide an instruction list for attaching/detaching the removable cookware handle 100 from the attachment member 105. In other embodiments, the insertable plate 355 may contain and electronic circuit and a display. The electronic circuit (not shown) may operate minor electronic devices such as a timer, a temperature gauge, an electronic cookbook, or the like which may display cooking information and tips to the user. Also present within the second cavity 315, a hole 360 may be bored through the housing 200. The insertable plate 355 positioned within the second cavity 315 can be manufactured to contain a similar hole. The presence of this hole 360 within the second cavity 315 allows the removable cookware handle 100 to be easily stored by the user. The user may store the removable cookware handle 100 on hooks or other hanging devices within the kitchen for optimal use of storage space and for easy retrieval when cooking. The removable cookware handle 100 can be stored by this hole 360 with or without secure attachment to the attachment member 105 and cookware piece 110. While the example figures show the existence of the hole 360 for this storage purpose, it should be understood that other embodiments are possible which do not include, individually or in combination, the hole 360, the second cavity 315, or the insertable plate 355. In such instances, the housing 200 of the removable cookware handle 100 would extend completely to the second longitudinal end 215.

On the front face 365 of the housing 200 in FIG. 3, a mounting chamber 370 can be viewed. The mounting chamber provides a location for the attachment member 105 to enter into the interior of the housing 200 of the removable cookware handle 100 to attach the removable cookware handle 100 to the cookware piece 110. The mounting chamber 370 can be manufactured to fit multiple designs of the attachment member 105. While the attachment member 105 (show in later Figures) is an angular design, it should be understood that multiple different attachment members 105 may be used to attach the removable cookware handle 100 to a cookware piece 110. The interior of the mounting chamber 370 may thus have different configurations. Also, there may be protrusions within the mounting chamber and formed as part of the housing 200 which help secure the interior components of the removable cookware handle 100 within the housing 200.

Figure 4:
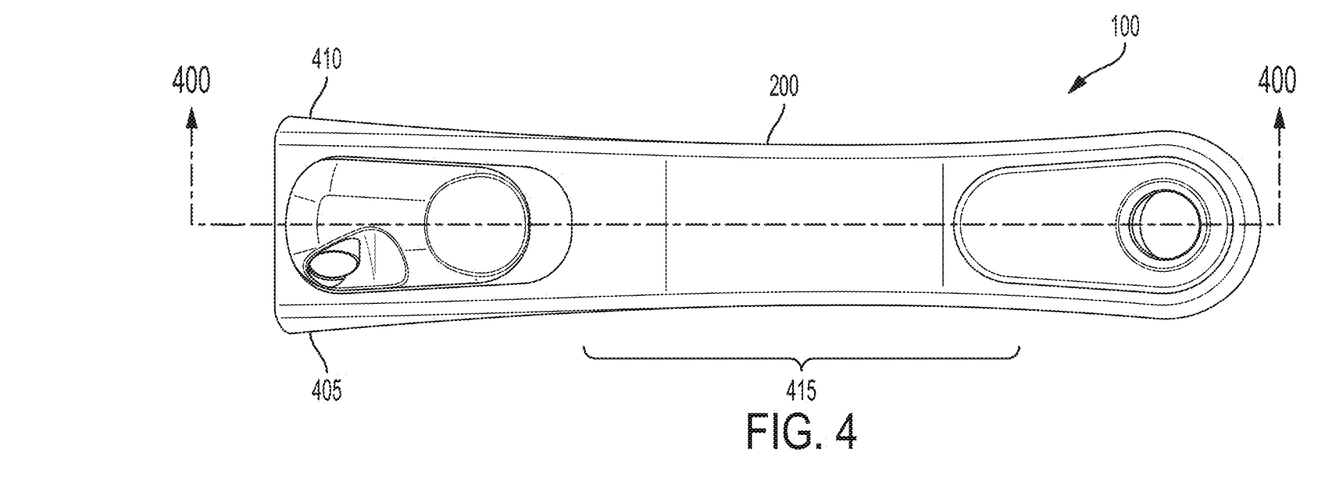
FIG. 4 shows a top view of the removable cookware handle.
Figure 5:
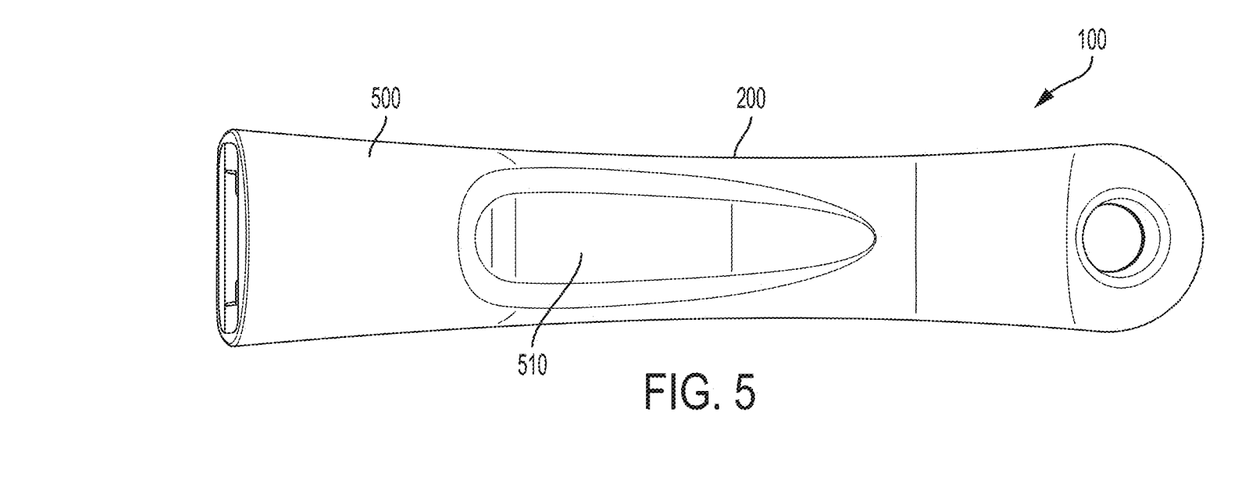
FIG. 5 is a bottom view of the removable cookware handle.

Turning now to FIGS. 4 and 5, a top view and bottom view of the removable cookware handle 100 is depicted. From the top view in FIG. 4, the presented axis line 400 shows the symmetrical nature of the removable cookware handle 100. The housing 200 of the removable cookware handle 100 is shown to be symmetrical to allow for easy ergonomic handling by the user. Additionally, the symmetrical design provides a stronger connection with the cookware piece 110 and lifting leverage as the attached cookware piece 110 is manipulated by the user. The differences between the cross sectional areas of the housing 200 can be seen as both the left housing side 405 and right housing side 410 curve inward 415 toward the middle of the housing 200 before expanding outward slightly toward the end of the housing 200. While this embodiment of the removable cookware handle 100 has the second recess 335 on the top left side of the first button mechanism 325, it should be understood from the earlier disclosure that the second recess 335 may be located on the top right side of the first button mechanism 325.

In FIG. 5, the back portion 500 of the removable cookware handle 100 is viewed. The same symmetrical design as seen in FIG. 4 is also present with this view. Furthermore, the back portion 500 of the housing 200 may have an attached gripping pad (not shown) in grip area 510 for easy grasping by the user. Like the housing 200, the possible attached gripping pad may be formed from a thermally resistant material and provide adequate friction contact to a user's hands if they are soiled with food particles commonly obtained while cooking.

Figure 6:
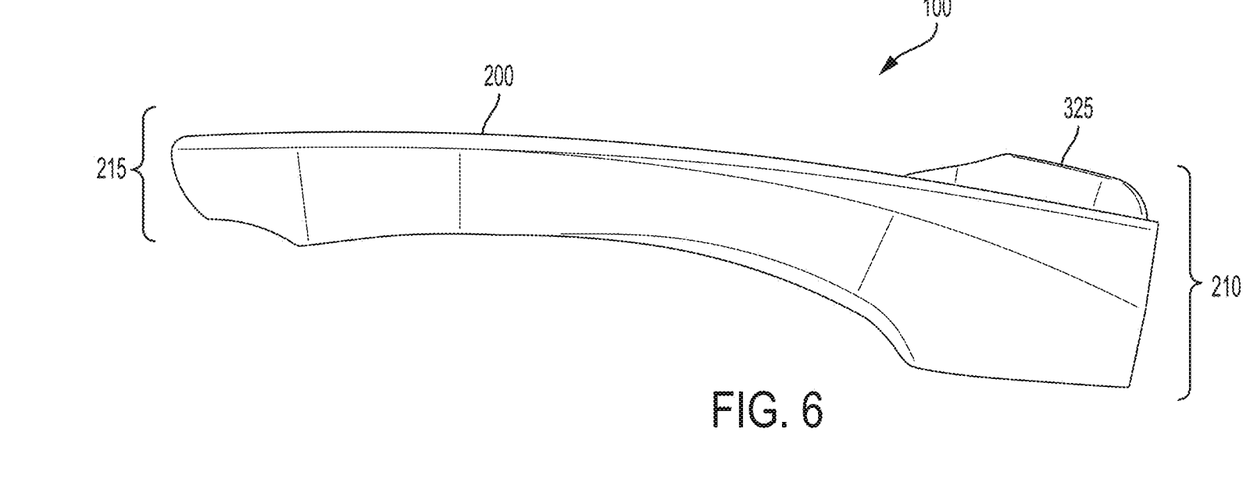
FIG. 6 is a right side view of the removable cookware handle.
Figure 7:
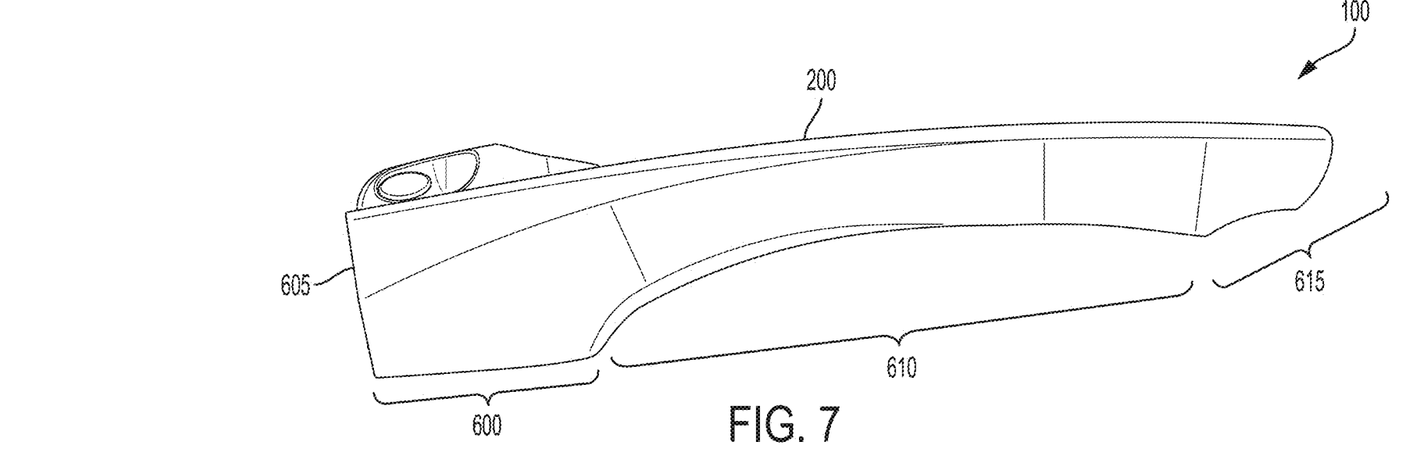
FIG. 7 is a left side view of the removable cookware handle.

FIGS. 6 and 7 show perspective left and right side views of the removable cookware handle 100. When viewing these figures, the approximate rise of the first button mechanism above the housing 200 is shown. This height can be adjusted based on the housing model or cookware piece 110 to provide the optimal height where the user can easily activate both the first and second button mechanisms 325 and 340 simultaneously. This would allow for easy attachment/detachment of the attachment member 105 and corresponding cookware piece 110. FIGS. 6 and 7 also show the contour of the housing 200 on the top and bottom sides. Overall, the housing 200 is angled slightly upward as it extends from the first longitudinal end 210 to the second longitudinal end 215. This angle allows the removable cookware handle 100 to not be parallel with the attached cookware piece 110 so that additional clearance is provided between the handle and an outside resting surface. This additional clearance gives the user more room to freely grasp, clutch, and manipulate the removable cookware handle 100. The bottom side of the removable cookware handle 100 is proportionally broken into segments providing different function based on the bottom side design. The first segment 600 has a slight upward trajectory and remains semi parallel to the top side of the removable cookware handle 100. This first segment 600 provides for a flush contact point 605 with the attachment member 105 so when the removable cookware handle 100 is lifted or moved, the removable cookware handle 100 will not wobble or disengage unexpectedly. The additional thickness in this first segment 600 also provides a less inviting grasping point for the user to protect the user's hand from being too close to a hot attachment member 105 or cookware piece 110, thereby risking injury.

The second segment 610 of the bottom side of the removable cookware handle 100 starts with a steeply curved semi-circular design. This portion of the bottom side provides an optimal and inviting ergonomic design where the user may ideally wish to grasp the removable cookware handle 100. Placing the optimal grasping position away from the flush contact point 605 between the housing 200 and the attachment member 105 further adds to the lever functionality of the removable cookware handle 100 allowing the user to manipulate and lift the attached cookware piece 110 with ease.

The third segment 615 of the bottom side of the removable cookware handle 100 is viewed as another steeply curved semi-circular design. This third segment 615 represents the exit portion of the bored hole through the housing of the removable cookware handle 100. Thus, the removable cookware handle 100 can be hanged or stored through this third segment 615 when not in use.

Figure 8:
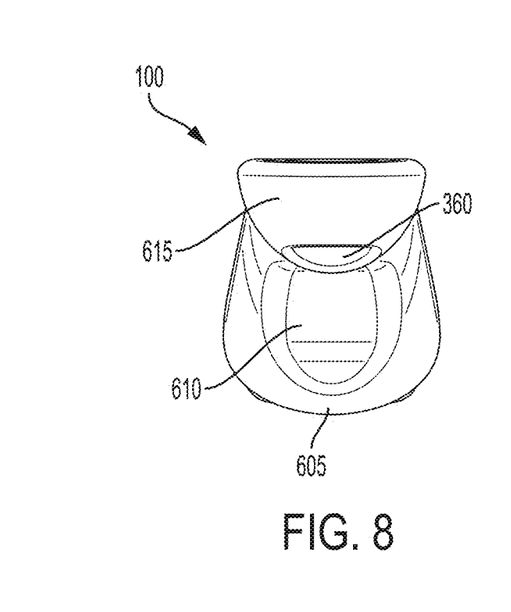
FIG. 8 is a rear view of the removable cookware handle.
Figure 9:
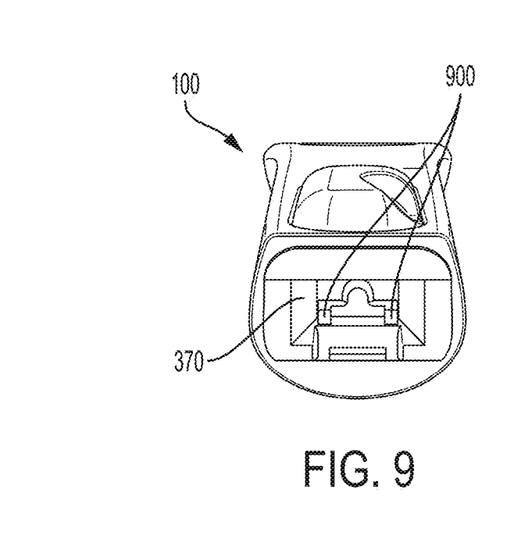
FIG. 9 is a front view of the removable cookware handle.

FIGS. 8 and 9 show a rear and front view of the removable cookware handle 100. The rear view shows the different segments 605, 610, and 615 of the bottom side of the housing 200 as they travel along the housing 200 from the first longitudinal end 210 to the second longitudinal end 215. The first segment 605 has a larger width than the third segment 615 of the housing 200. Furthermore, the lower portion of the hole 360 bored through the housing 200 can be viewed from the rear. From the front view, the increase upward angle of the housing 200 is visibly shown. Additionally, the mounting chamber 370 is viewed to accept the attachment member 105. Protrusions 900 can be seen on the left and right sides within the mounting chamber 370 showing how the interior components of the housing 200 may be contained within the housing 200.

Figure 10:
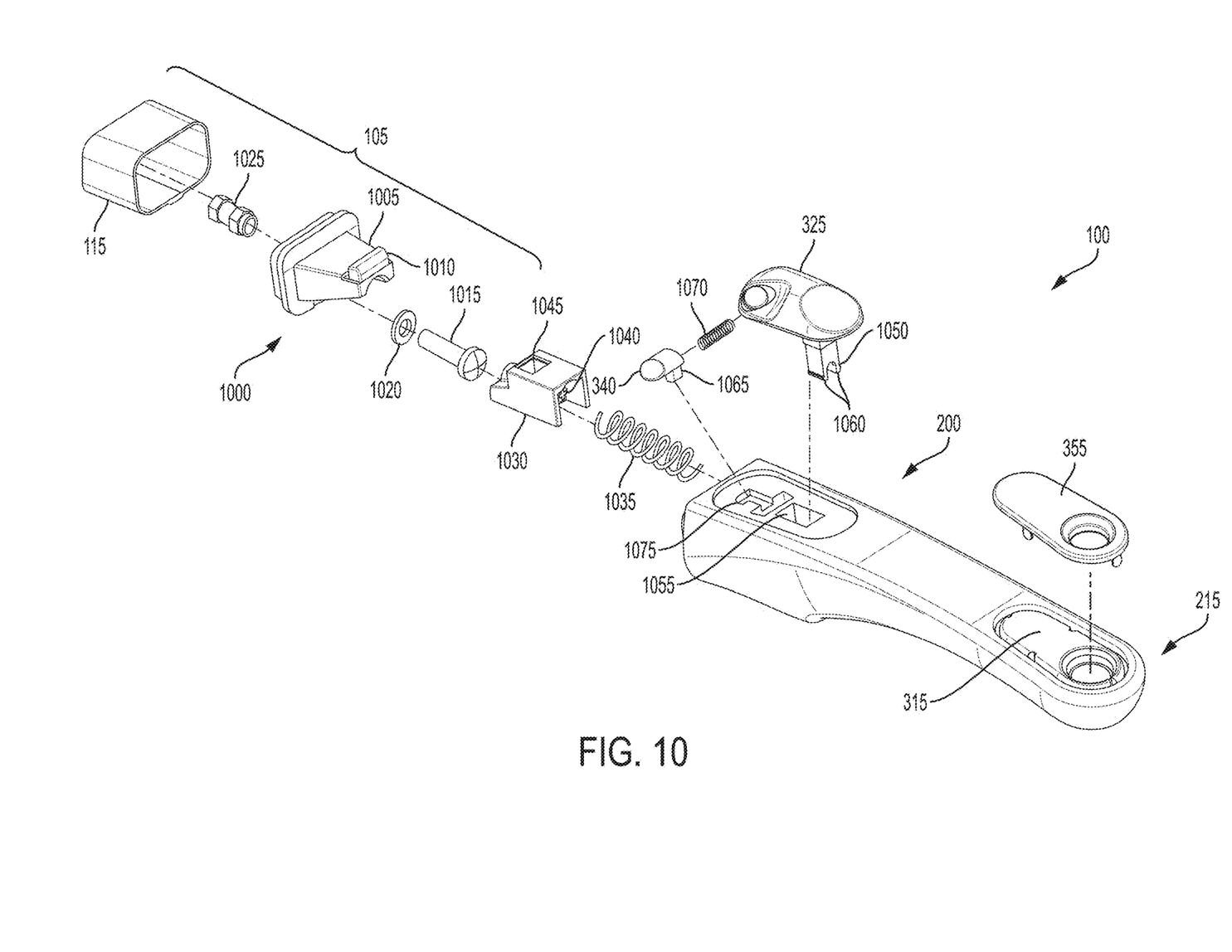
FIG. 10 is an expanded view of the interior components of the removable cookware handle.

Now turning to FIG. 10, an expanded view of the removable cookware handle 100 and the attachment member 105 is shown. An arm 115 is used to separate the attachment member 105 from the side of the cookware piece 110. One end of the arm 115 is positioned flushed against an outer side of the cookware piece 110 and the other end of the arm 115 is configured to receive the attachment component 1000 of the attachment member 105. For example, and as shown in FIG. 10, the attachment component 1000 may be a male end positioned to fit snuggly into the female arm 115. In an example embodiment, the attachment component 1000 at one end fits into the arm 115 and the other end extends outwardly on the same axis to fit into the mounting chamber 370. The outward extension 1005 of the attachment component 1000 is angled toward the interior to fit into the mounting chamber 370. At the end of the outward extension 1005 an upward lip 1010, formed as part of the outward extension 1005, creates a locking base for the entire attachment member 105. When affixed into the mounting chamber 370, the upward lip 1010 may fit into a locking cavity (not shown, but an internal part of the housing 200) upward through the housing 200 and into the first cavity 300 area. The position of the upward lip 1010 within the locking cavity fits the attachment member 105 securely to the removable cookware handle 100.

After depressing the second button mechanism 340 and pulling back the first button mechanism 325, the user may position the upward lip 1010 into the locking cavity. When placing the upward lip 1010 into this position, the user may lift the second longitudinal end 215 of the housing 200 to slide the attachment member 105 into place. Once within the locking cavity the user may release both the first and second button mechanism 325 and 340 to lock the attachment member 105 into position thereby connecting the cookware piece 110 to the removable cookware handle 100.

To fix the attachment component 1000 and the arm 115 to the side of the cookware piece 110, a fastening combination may be used. For example, a screw 1015 may be position against a washer 1020 through a bore within the attachment component 1000. The screw 1015 may thread into a casing 1025 hidden within the arm 115 to securely fasten the attachment component 1000 to the arm 115. Of course, this is only one fastening combination viewed by the example figure. It should be understood that multiple different fastening combinations may be used so long as the attachment member 105 is securely placed onto the cookware piece 110 and connectable to the removable cookware handle 100.

The remaining components of FIG. 10 are contained on or within the housing 200 of the removable cookware handle 100. For example, a spacer 1030 is shown which is located within the interior of the housing 200 of the removable cookware handle 100. The spacer 1030 is movable within the interior of the housing 200 in an interior channel. The spacer 1030 is held within the interior channel by the protrusions 900 of the mounting chamber 370 and is positioned behind the mounting chamber 370. At the opposite end of the spacer 1030 a spring 1035 may be attached to the spacer 1030 with the other end of the spring 1035 attached to a solid piece of the housing 200. The spring 1035 wound around a peg 1040 protruding from the back of the spacer 1030 may provide this attachment. The spring 1035, by its nature, is compressible. When positioned behind the spacer 1030 the force of the spring 1035 pushes the spacer 1030 forward to be resting against the protrusion 900 within the mounting chamber 370.

The spacer 1030 also has a spacer opening 1045 on the top portion of the spacer 1030. The spacer opening 1045 allows a first button extension 1050 to enter into the interior of the spacer 1030 and become secured within the spacer 1030. The first button extension 1050 protrudes in a downward direction from the bottom of the first button mechanism 325 and through an extension bore 1055 into the interior of the housing 200. When placed inside the spacer 1030, the first button extension 1050 may have a plurality of flanges 1060 on each side allowing the first button extension 1050 to deform slightly in shape and then snap back when connected onto the spacer 1030. When inside the spacer opening 1045 the plurality of flanges 1060 keep the first button mechanism 325, via the first button extension 1050, from dislodging from the spacer 1030. In this position, both the first button mechanism 325 and the spacer 1030 are securely attached to and within the housing 200 of the removable cookware handle 100.

The extension bore 1055 is bigger in length than the first button extension 1050. The width of the extension bore 1055 is similar to that of the width of the first button extension 1050. This longer length of the extension bore 1055 allows the first button mechanism/spacer combination to be slidable by the user. The spring 1035 attached between the spacer 1030 and the housing 200 provides a force keeping the first button mechanism/spacer combination in a forward position. This is also known as a locked position when the attachment member 105 is locked within the housing 200. Effectively, when the attachment component 1000 is placed within the locking cavity the force of the spring 1035 on the spacer 1030 presses the spacer 1030 against the contour of the attachment component 1000. This pressure against the contour forms a cohesive interconnection of the interior housing components so that the removable cookware handle 100 does not wiggle or dislodge when a user is manipulating the removable cookware handle 100 attached to the cookware piece 110. When the first button mechanism/spacer combination is pulled backward by a user, the first button mechanism/spacer is in an unlocked position. Here, the attachment component 1000 may be dislodged from the locking cavity and the attachment component 1000 may be removed from the mounting chamber 370. After removal, the force of the spring 1035 moves the first button mechanism/spacer combination back into the forward locked position as the resting position.

Also seen in FIG. 10 is the second button mechanism 340. The second button mechanism 340 is viewed in expanded form outside the first button mechanism 325, but it should be understood that the second button mechanism 340 is located within the first button mechanism 325. The second button mechanism 340 has a second button extension 1065 that extends in a downward direction from the bottom of the second button mechanism 340. This second button extension 1065 helps secure the second button mechanism 340 within the first button mechanism 325. Between an interior side wall of the first button mechanism 325 and an end of the second button mechanism 340 a second spring 1070 is present. The second spring 1070 provides a force on the second button mechanism 340 to keep the second button mechanism 340 in an extended position within the first button mechanism 325.

When placed into the housing 200, the second button extension 1065 fits into a second extension bore 1075 on the housing 200. The second extension bore 1075 has an upside down L-shaped design. When the second button mechanism 340 is positioned within the first button mechanism 325 and attached to the housing 200 of the removable cookware handle 100, the second button extension 1065 rests within the horizontal portion of the upside down L-shaped design. This is the locked position of both the first button mechanism 325 and the position where the attachment member 105 may be locked within the removable cookware handle 100. In this position, the first button mechanism 325 cannot be moved backward to the unlock position as the second button extension 1065 will contact the side of the second extension bore 1075 prohibiting the backward movement. Thus, to unlock the attachment member 105 from the removable cookware handle 100, the user must first depress the second button mechanism 340 and thereby slide the second button extension 1065 into the vertical lane of the upside down L-shaped design. Once the second button extension 1065 is in the vertical lane, the first button mechanism 325 is now able to slide into the unlocking position for removal of the attachment member 105. If in the unlocking position, and without the attachment member 105 within the mounting chamber 370, the user releases both the first and second buttons, the first button mechanism/spacer combination will slide into the forward locked position by the spring 1035 and the second button extension 1065 will slide back into the horizontal portion of the upside down L-shaped design by the force of the second spring 1070. This then secures both buttons mechanism 325 and 340 until attachment of the same or a new attachment member 105 is needed Finally, at the second longitudinal end 215 of the housing 200 the insertable plate 355 is viewed as to how it may be positioned within the second cavity 315.

Figure 11:
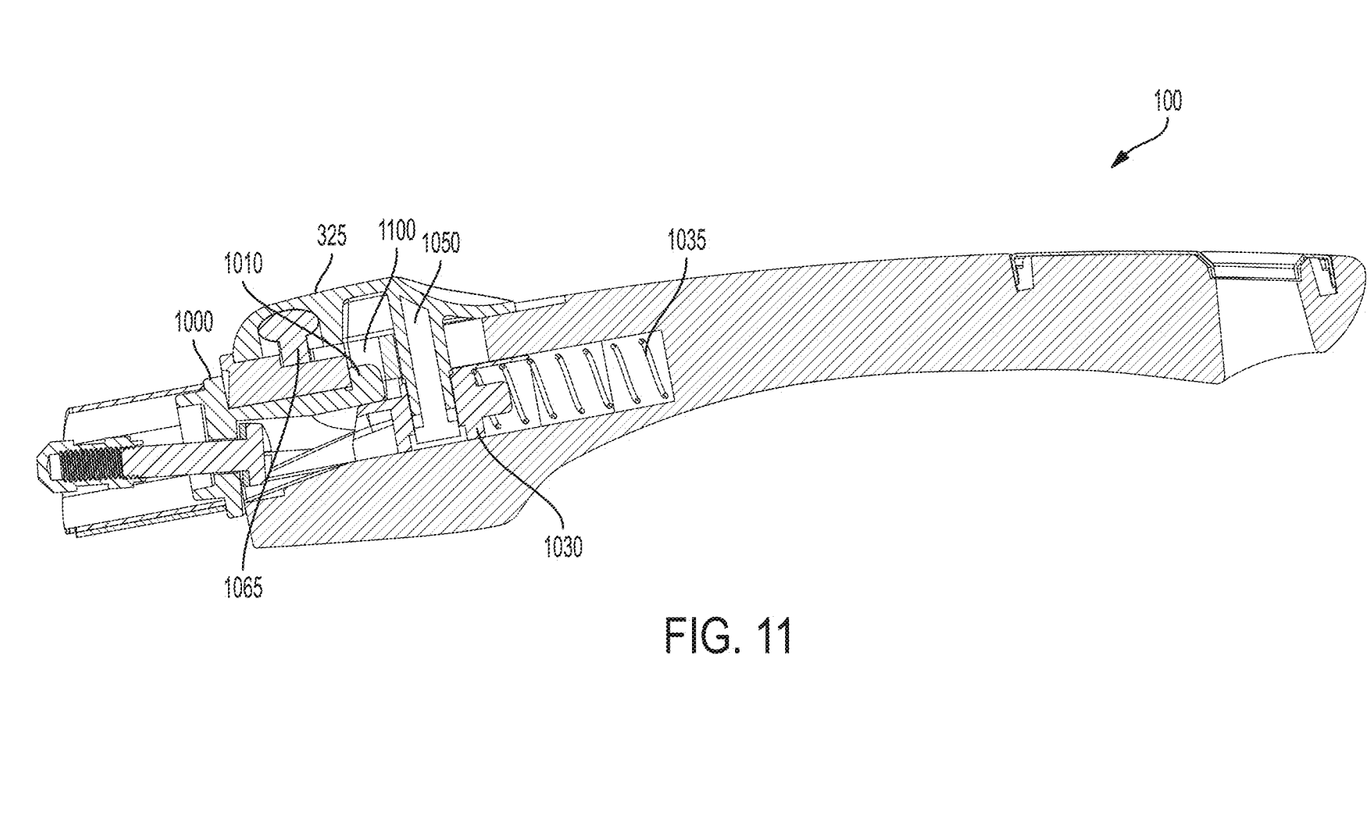
FIG. 11 is an interior cross-sectional view of the removable cookware handle connected to an attachment member which may be attached to a piece of cookware.

Turning now to FIG. 11, an interior cross sectional view of the removable cookware handle 100 is shown. This view shows each component of the removable cookware handle 100 completely assembled and attached to the attachment member 105. Thus, in this cross-sectional view the spring 1035 can be clearly seen providing force to the spacer 1035 to press against the attachment member 105 in the locking position. The upward lip 1010 of the attachment component 1000 is viewed within the locking cavity 1100 and shows the attachment component 1000 contacting the upper interior of the mounting chamber 370. Furthermore, the first button extension 1050 is shown secured to the spacer 1030 where the first button mechanism 325 is in the locked or forward position. Also in this locked or forward position the second button extension 1065 is viewed within the horizontal portion of the upside down L-shaped design to keep the first button mechanism/spacer combination within the locking position.

Figure 12:
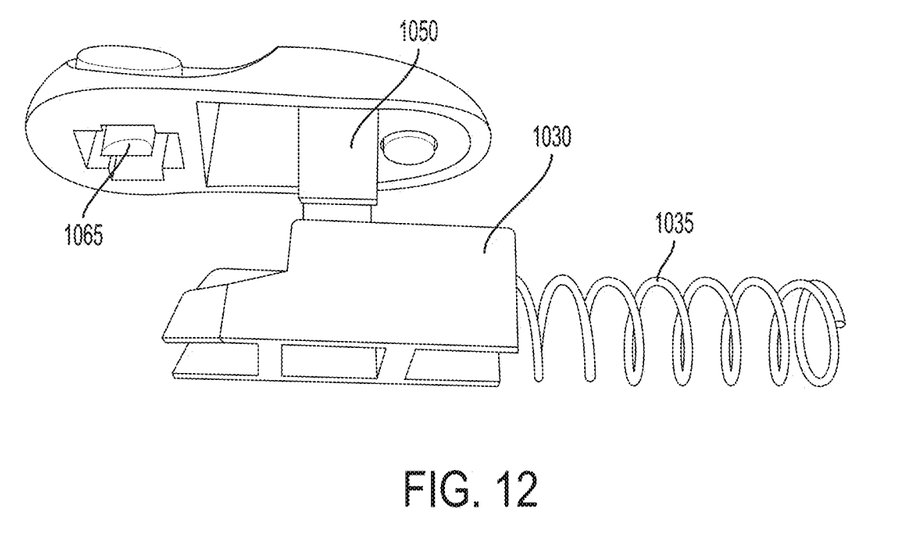
FIG. 12 is a left side view of the first button attached to a spacer removed from the removable cookware handle.

FIG. 12 is another view of the first button mechanism/spacer combination outside of the housing 200 of the removable cookware handle 100. This view shows the spring 1035 attached to the back end of the spacer 1030 by fitting on a peg (internal) extending from the spacer 1030. Although the peg is not viewed in this figure, it can be viewed in FIG. 10. The first button extension 1050 is also securely attached to the spacer 1030 through the spacer opening 1045 and secured by the plurality of flanges 1060. The second button mechanism 340 is secured within the first button mechanism 325 and the second button extension 1065 may be seen located in the horizontal position of the upside down L-shaped design.

Figure 13:
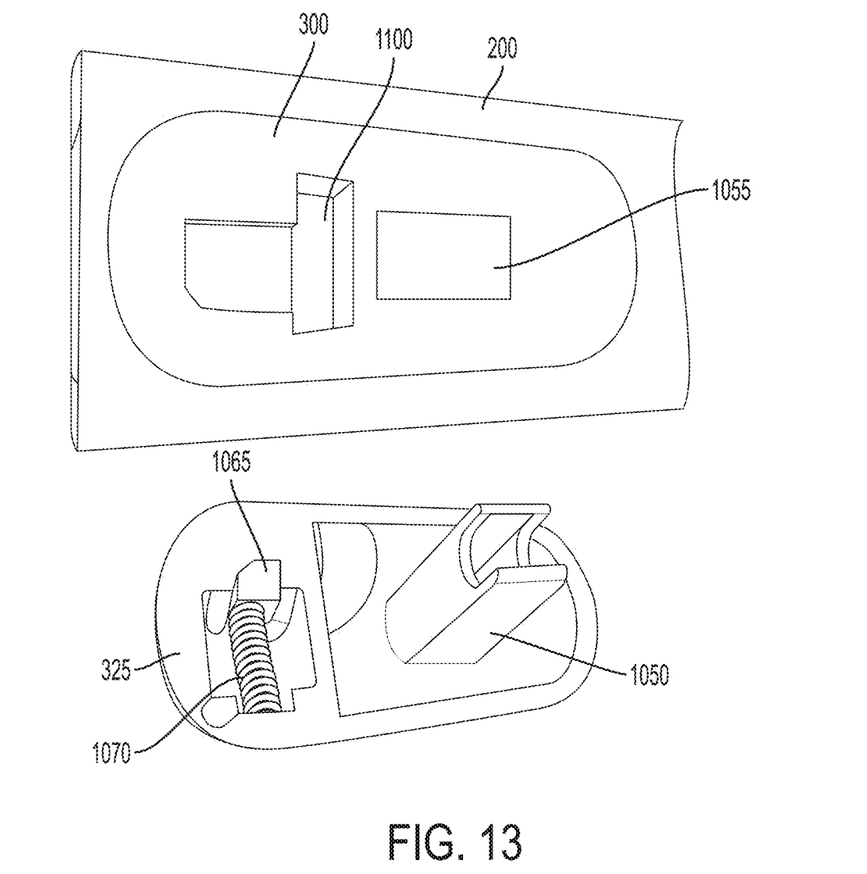
FIG. 13 is an expanded view showing a bottom view of a first button of the removable cookware handle removed from a housing of the removable cookware handle as well as a top side of the housing of the removable cookware handle.

FIG. 13 shows a bottom view of the first button mechanism 325 and the housing 200 of the removable cookware handle 100. Here the first button extension 1050 is clearly seen extending out of the center back portion of the first button mechanism 325. Further, the bottom portion of the second button extension 1065 is viewed within the first button mechanism 325. The second spring 1070 is shown providing force to the second button mechanism 340 to keep the second button mechanism 340 in an extended position.

For the housing 200 of FIG. 13, the different voids can be shown within the first cavity 300. The extension bore 1055 is shown being of a longer length than the first button extension 1050 but of a similar width. The locking cavity 1100 is viewed where the upward lip 1010 of the attachment component 1000 can be positioned to lock the attachment component 1000 to the removable cookware handle 100. Also the second extension bore 1075 is viewed in the upside down L-shaped design. Here the second button extension 1065, when the second button mechanism 340 is depressed by the user, can move from the horizontal position to the vertical path to facilitate locking and unlocking of the attachment component 1000.

Figure 14:
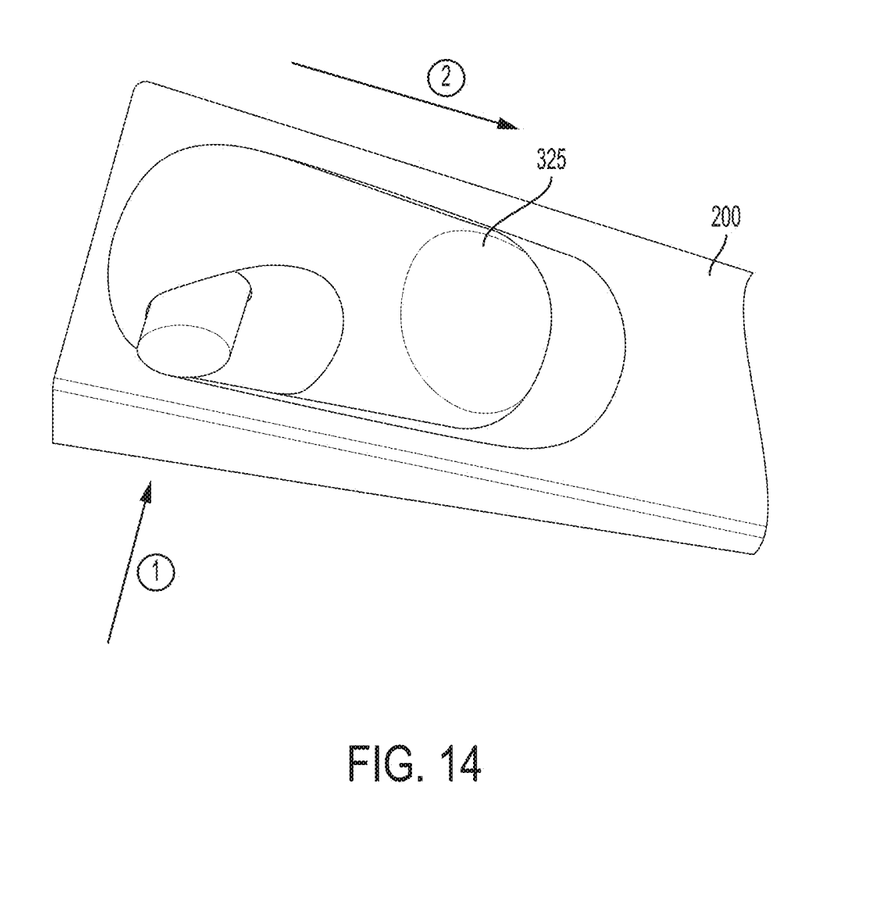
FIG. 14 is an action view of the first and second button mechanisms of the removable cookware handle used to engage and disengage the removable cookware handle from an attachment member.

Finally, FIG. 14 shows an action sequence for unlocking an attachment member 105 from the removable cookware handle 100. In FIG. 14, the first button mechanism 325 and the second button mechanism 340 are viewed attached to the housing 200 of the removable cookware handle 100. First, a user depresses the second button mechanism 340, and usually with the same action, slides the first button mechanism 325 backward into the unlocking position. After the attachment member 105 is removed, the user may release their grasp on the first and second button mechanisms 325 and 340 to allow the springs 1035 and 1070 to move the first and second button mechanisms 325 and 340 back into the original resting positions also known as the locking position.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A removable cookware handle comprising:
   a housing having an interior and first and second longitudinal ends, the housing interior having a mounting chamber adapted and configured to receive an attachment member at the first longitudinal end when the attachment member is inserted into the interior of the housing;
   a first button mechanism disposed on a top side of the housing, the first button mechanism being adapted and configured to move in a forward direction toward the first longitudinal end of the housing and a backward direction toward the second longitudinal end of the housing;
   a second button mechanism arranged on and contained within the first button mechanism, the second button mechanism being movable between an expanded position in which the second button mechanism extends away from a surface of the first button mechanism and a depressed position in which the second button mechanism is moved through the surface of the first button mechanism;
   a spacer movable within the interior of the housing and operatively connected to the first button mechanism; and
   wherein when the second button mechanism is moved to the depressed position and the first button mechanism is moved in the backward direction, the spacer moves in the backward direction to unsecure the attachment member.

2. The removable cookware handle of claim 1, wherein the first button mechanism has a first button extension attached to a bottom side of the first button mechanism, the first button extension operatively connected to the spacer within the interior of the housing.

3. The removable cookware handle of claim 1, wherein a spring is located behind the spacer within the interior of the housing and the spring biases the spacer in the forward direction towards the first longitudinal end of the housing.

4. The removable cookware handle of claim 1, wherein the mounting chamber has a plurality of protrusions configured to retain the spacer within the interior of the housing.

5. The removable cookware handle of claim 1, wherein the housing includes an extension bore and the first button mechanism has a first button extension attached to a bottom side of the first button mechanism, the first button extension extends through the extension bore with the first button mechanism operatively connected to the spacer, the extension bore has a length longer than a length of the first button extension and a width of the extension bore is dimensioned for a close slip fit with the first button extension.

6. The removable cookware handle of claim 5, wherein the housing includes a second extension bore.

7. The removable cookware handle of claim 6, wherein the second extension bore extends in the longitudinal direction of the housing and in a direction transverse to the longitudinal direction of the housing.

8. The removable cookware handle of claim 7, wherein the second button mechanism has a second button extension disposed in the second extension bore, the second button extension being adapted and configured to travel in the second extension bore in the longitudinal and transverse directions relative to the housing.

9. The removable cookware handle of claim 1, wherein the second button mechanism abuts a second spring within the first button mechanism, the second spring adapted and configured to bias the second button mechanism to the expanded position.

10. A system for assembling cookware, the system comprising:
a cookware piece having a cooking surface and an exterior facing surface;
an attachment member fastened to a portion of the exterior facing surface; and
a removable cookware handle adapted and configured for removable attachment with the attachment member, the removable cookware handle comprising:
a housing, the housing having opposite first and second longitudinal ends, the housing having a hollow interior, the hollow interior having a mounting chamber, the mounting chamber being adapted and configured to receive the attachment member at the housing first longitudinal end when the attachment member is inserted into the interior of the housing;
a first button mechanism disposed on a top side of the housing, the first button mechanism being adapted and configured to move in a forward direction toward the first longitudinal end of the housing and a backward direction toward the second longitudinal end of the housing;
a second button mechanism arranged on and contained within the first button mechanism, the second button mechanism being movable between an expanded position in which the second button mechanism extends away from a surface of the first button mechanism and a depressed position in which the second button mechanism is moved through the surface of the first button mechanism;
a spacer movable within the interior of the housing and operatively connected to the first button mechanism; and
wherein when the second button mechanism is moved to the depressed position and the first button mechanism is moved in the backward direction, the spacer moves in the backward direction to unsecure the attachment member.

11. The system for assembling cookware of claim 10, wherein the attachment member has a tapered end with an upward lip adapted and configured for attaching to a locking cavity within the housing of the removable cookware handle.

12. The system for assembling cookware of claim 10, wherein the first button mechanism has a first button extension attached to a bottom side of the first button mechanism and the first button extension is operatively connected to the spacer within the interior of the housing.

13. The system for assembling cookware of claim 10, further comprising a spring located adjacent to the spacer within the interior of the housing, the spring being adapted and configured to bias the spacer toward the first longitudinal end of the housing in the interior of the housing.

14. The system for assembling cookware of claim 10, wherein the mounting chamber has a plurality of protrusions adapted and configured to retain the spacer in the interior of the housing.

15. The system for assembling cookware of claim 10, wherein the housing includes an extension bore and the first button mechanism has a first button extension attached to a bottom side of the first button mechanism, the first button extension extends through the extension bore with the first button mechanism operatively connected to the spacer, the extension bore has a length longer than a length of the first button extension and a width of the extension bore is dimensioned for a close slip fit with the first button extension.

16. The system for assembling cookware of claim 15, wherein the housing includes a second extension bore.

17. The system for assembling cookware of claim 16, wherein the second extension bore extends in the longitudinal direction of the housing and in a direction transverse to the longitudinal direction of the housing.

18. The system for assembling cookware of claim 17, wherein the second button mechanism has a second button extension disposed in the second extension bore, the second button extension being adapted and configured to travel in the second extension bore in the longitudinal and transverse directions relative to the housing.

19. The system for assembling cookware of claim 10, wherein the second button mechanism abuts a second spring within the first button mechanism, the second spring adapted and configured to bias the second button mechanism to the expanded position.

* * * * *